(12) United States Patent
Park et al.

(10) Patent No.: US 12,507,444 B2
(45) Date of Patent: Dec. 23, 2025

(54) NEURON, NEUROMORPHIC SYSTEM INCLUDING THE SAME

(71) Applicant: IUCF-HYU (Industry-University Cooperation Foundation Hanyang University), Seoul (KR)

(72) Inventors: Jea Gun Park, Seongnam-si (KR); Dong Won Kim, Seoul (KR)

(73) Assignee: IUCF-HYU (INDUSTRY-UNIVERSITY COOPERATION FOUNDATION HANYANG UNIVERSITY), Seoul (KR)

( * ) Notice: Subject to any disclaimer, the term of this patent is extended or adjusted under 35 U.S.C. 154(b) by 1092 days.

(21) Appl. No.: 17/416,616

(22) PCT Filed: Nov. 6, 2019

(86) PCT No.: PCT/KR2019/015004
§ 371 (c)(1),
(2) Date: Jan. 24, 2022

(87) PCT Pub. No.: WO2020/130342
PCT Pub. Date: Jun. 25, 2020

(65) Prior Publication Data
US 2022/0149200 A1 May 12, 2022

(30) Foreign Application Priority Data
Dec. 19, 2018 (KR) .................. 10-2018-0165708

(51) Int. Cl.
*H10D 30/69* (2025.01)
*G06N 3/065* (2023.01)
(Continued)

(52) U.S. Cl.
CPC .......... *H10D 30/711* (2025.01); *G06N 3/065* (2023.01); *H10B 63/20* (2023.02); *H10N 70/24* (2023.02)

(58) Field of Classification Search
CPC . H01L 29/7841; H01L 29/772; H01L 21/762; H01L 27/1203; G06N 3/065;
(Continued)

(56) References Cited

U.S. PATENT DOCUMENTS

2006/0255405 A1    11/2006  Tsui et al.
2015/0129967 A1*   5/2015   Kumar .............. H01L 21/31111
                                                              257/350
2018/0174025 A1*   6/2018   Jin ..................... G06N 3/065

FOREIGN PATENT DOCUMENTS

CN           1825602 A      8/2006
KR    10-2002-0001420 A     1/2002
(Continued)

OTHER PUBLICATIONS

V. Ostwal, R. Meshram, B. Rajendran and U. Ganguly, "An ultra-compact and low power neuron based on SOI platform," 2015 International Symposium on VLSI Technology, Systems and Applications, Hsinchu, Taiwan, 2015, pp. 1-2, doi: 10.1109/VLSI-TSA.2015.7117569 (Year: 2015).*
(Continued)

*Primary Examiner* — Sitaramarao S Yechuri
(74) *Attorney, Agent, or Firm* — Sughrue Mion, PLLC

(57) ABSTRACT

Disclosed are a neuron and a neuromorphic system including the same. More particularly, a neuron according to an embodiment of the present invention includes a completely depleted Silicon-On-Insulator (SOI) device whose a depletion region is controlled according to an inputted electrical signal to perform integration and leakage.

10 Claims, 21 Drawing Sheets

(51) Int. Cl.
*H10B 63/00* (2023.01)
*H10N 70/20* (2023.01)

(58) Field of Classification Search
CPC ........ G06N 3/088; G06N 3/049; H10B 63/20;
H10B 61/00; H10N 70/24; H10N 70/245;
H10N 70/8825; H10N 59/00; H10D
30/711; H10D 30/00; H10D 86/201
See application file for complete search history.

(56) References Cited

FOREIGN PATENT DOCUMENTS

| | | |
|---|---|---|
| KR | 10-2016-0019682 A | 2/2016 |
| KR | 10-2016-0062052 A | 6/2016 |
| KR | 10-1727546 B1 | 5/2017 |
| KR | 10-2018-0093687 A | 8/2018 |

OTHER PUBLICATIONS

Zhuo Qing-Qing, et al., "Mechanism of three kink effects in irradiated partially-depleted SOINMOSFET's", Acta Phys. Sin., 2013, vol. 62, No. 3, pp. 036105-1-036105-6 (6 pages total).
Charlotte Frenkel et al., "A 0.086-mm2 12.7-pJ/SOP 64k-Synapse 256-Neuron Online-Learning Digital Spiking Neuromorphic Processor in 28nm CMOS", IEEE Transactions on Biomedical Circuits and Systems, Nov. 10, 2018, vol. XX, No. XX, XXXXX, 14pages.
Korea Intellectual Property Office Grant of Patent for KR 10-2018-0165708 dated Feb. 5, 2021.
International Search Report for PCT/KR2019/015004 dated Feb. 19, 2020 [PCT/ISA/210].

\* cited by examiner

[FIG. 1A]
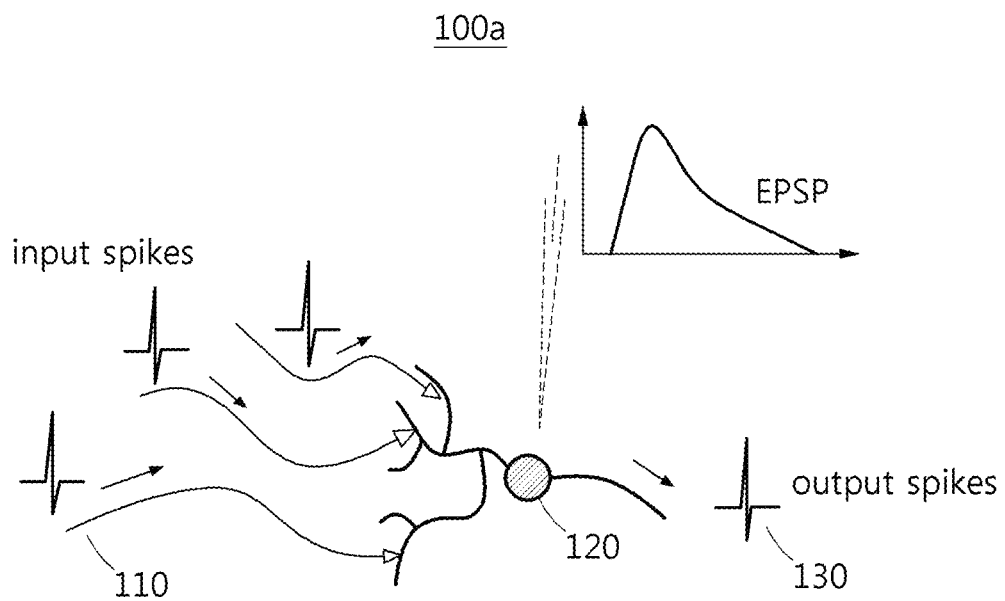
[FIG. 1B]
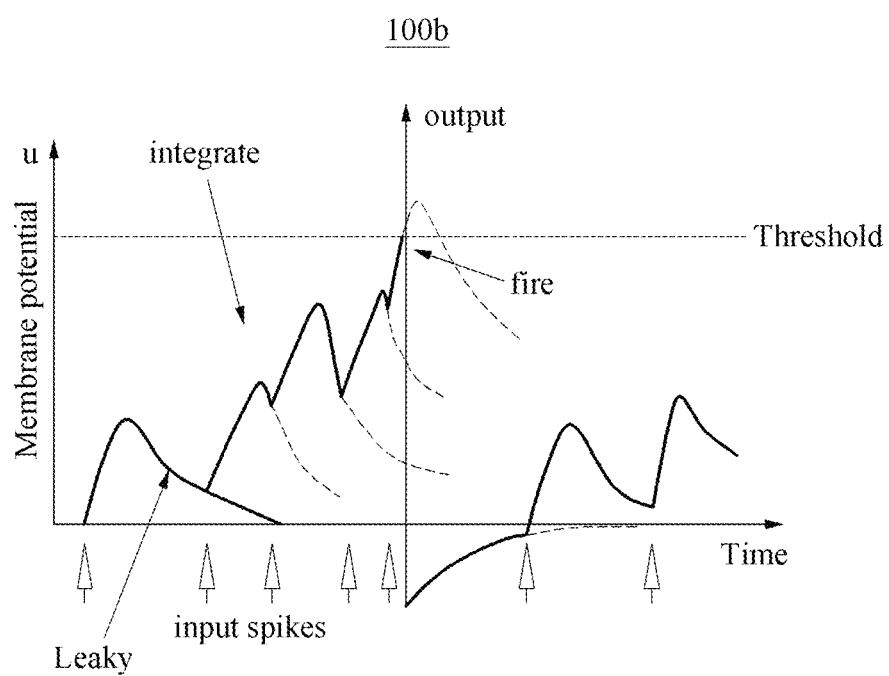

[FIG. 2]
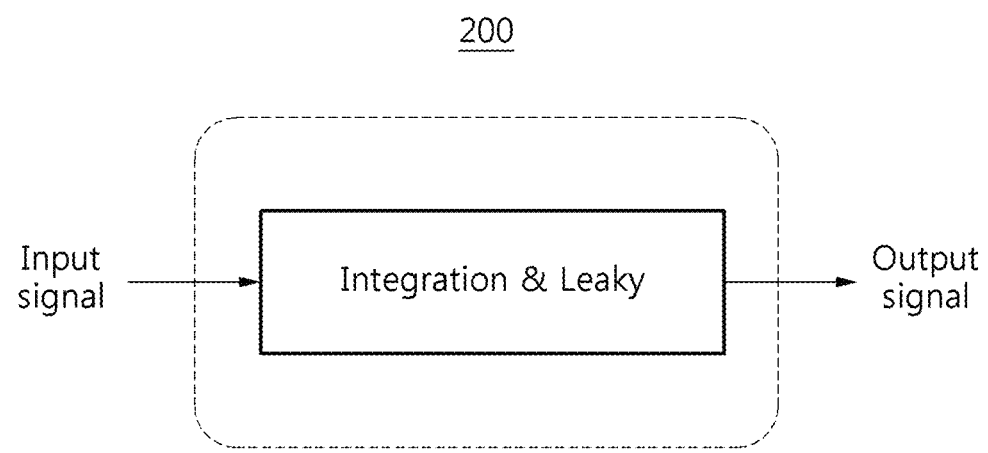
[FIG. 3]
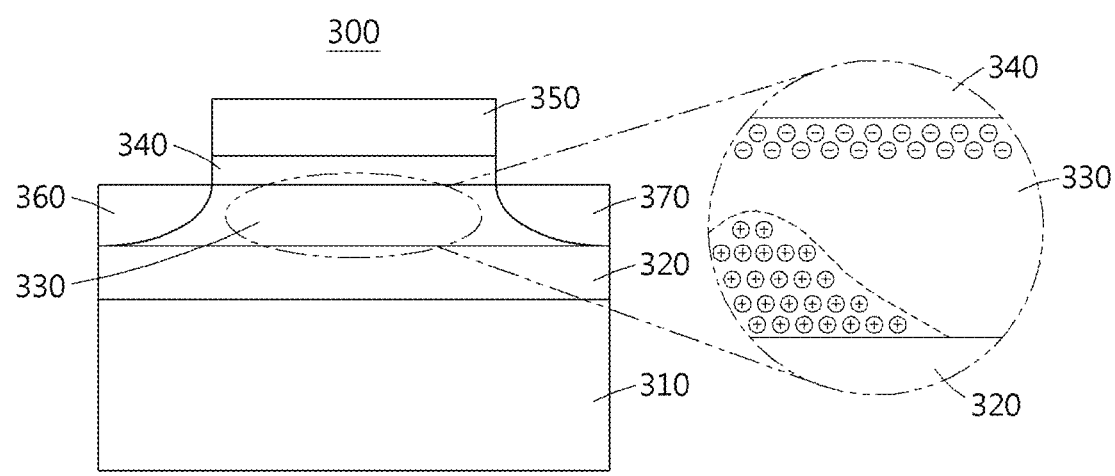

[FIG. 4]
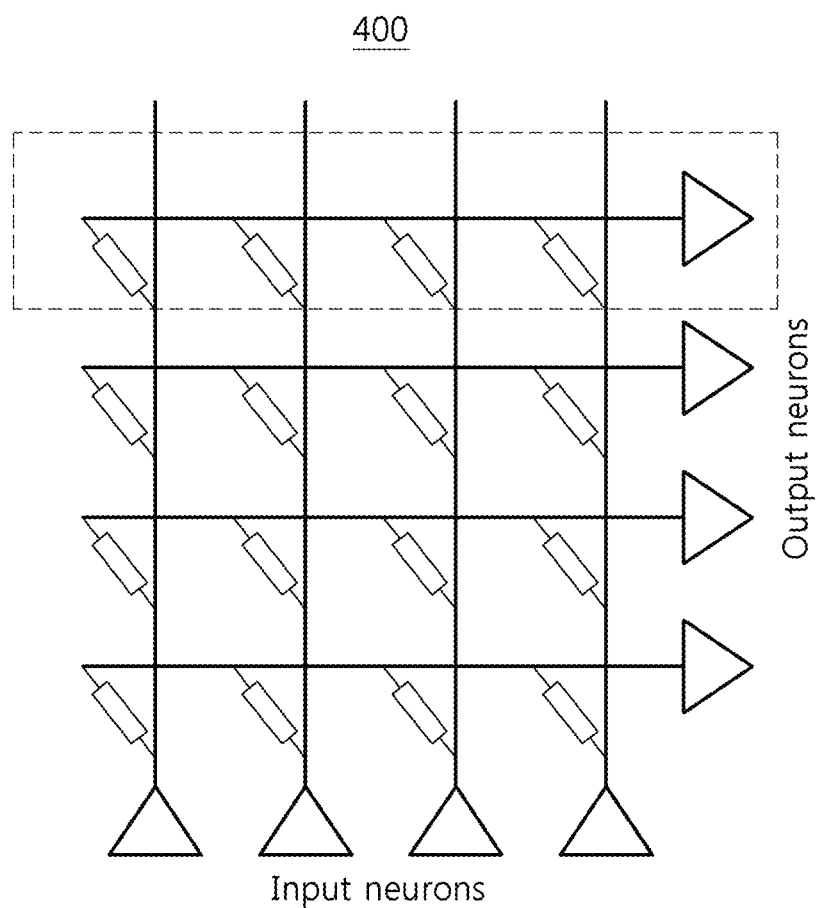

[FIG. 5]
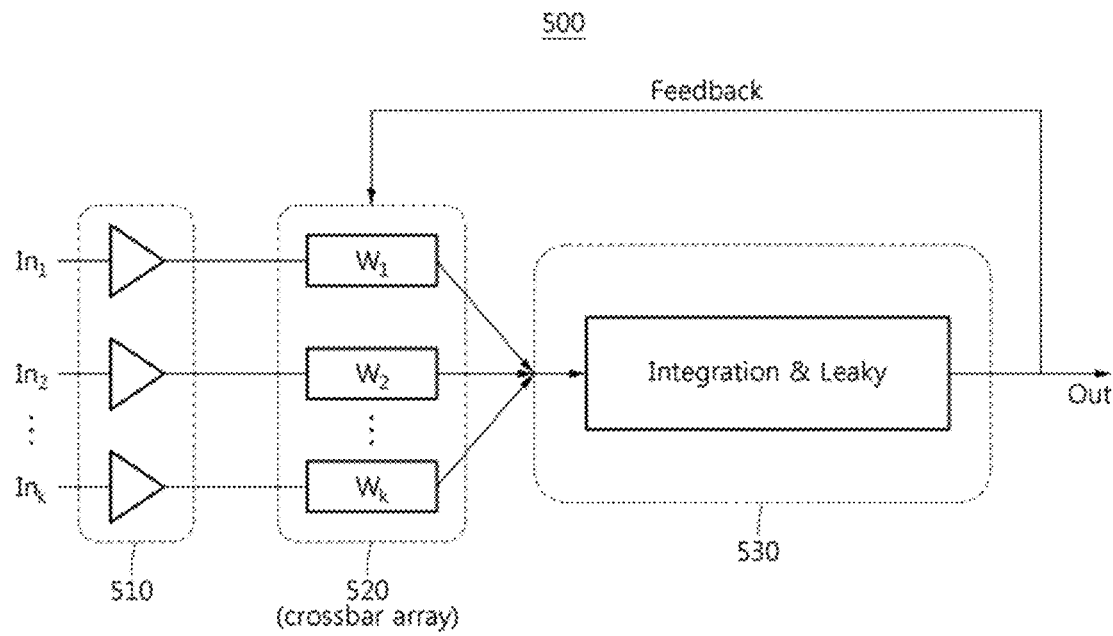
[FIG. 6]
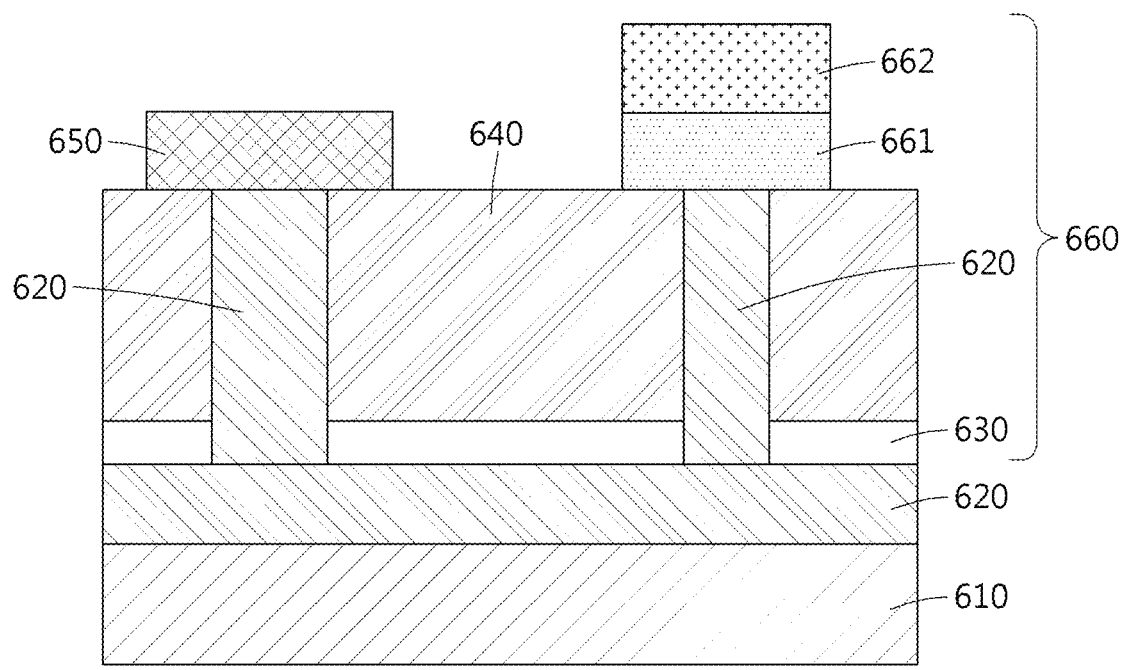

[FIG. 7]
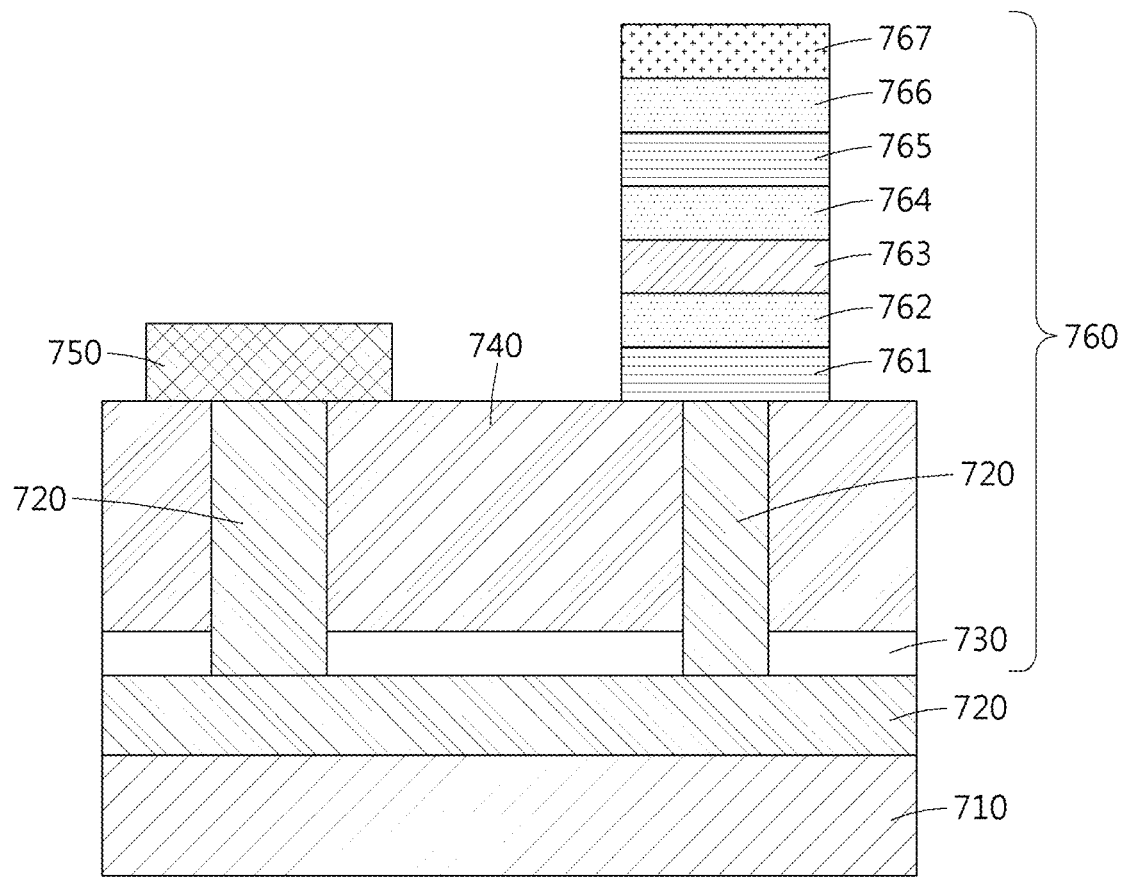

[FIG. 8A]
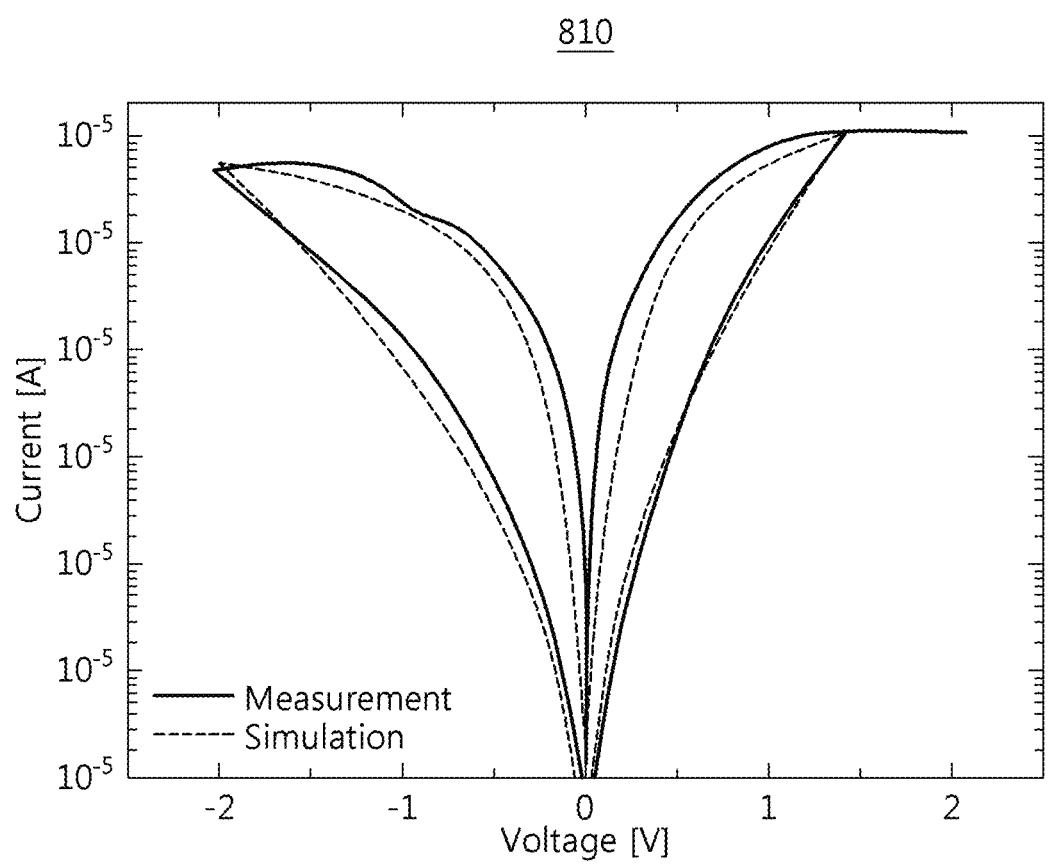

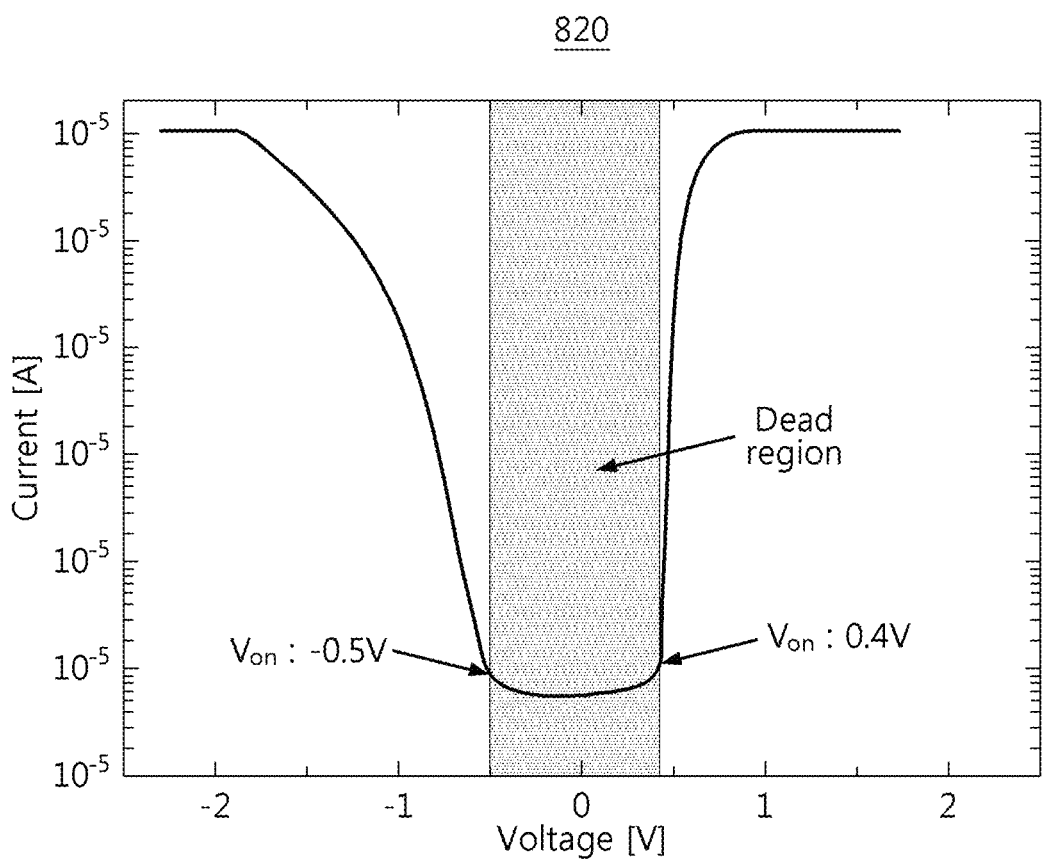
[FIG. 8B]

[FIG. 8C]
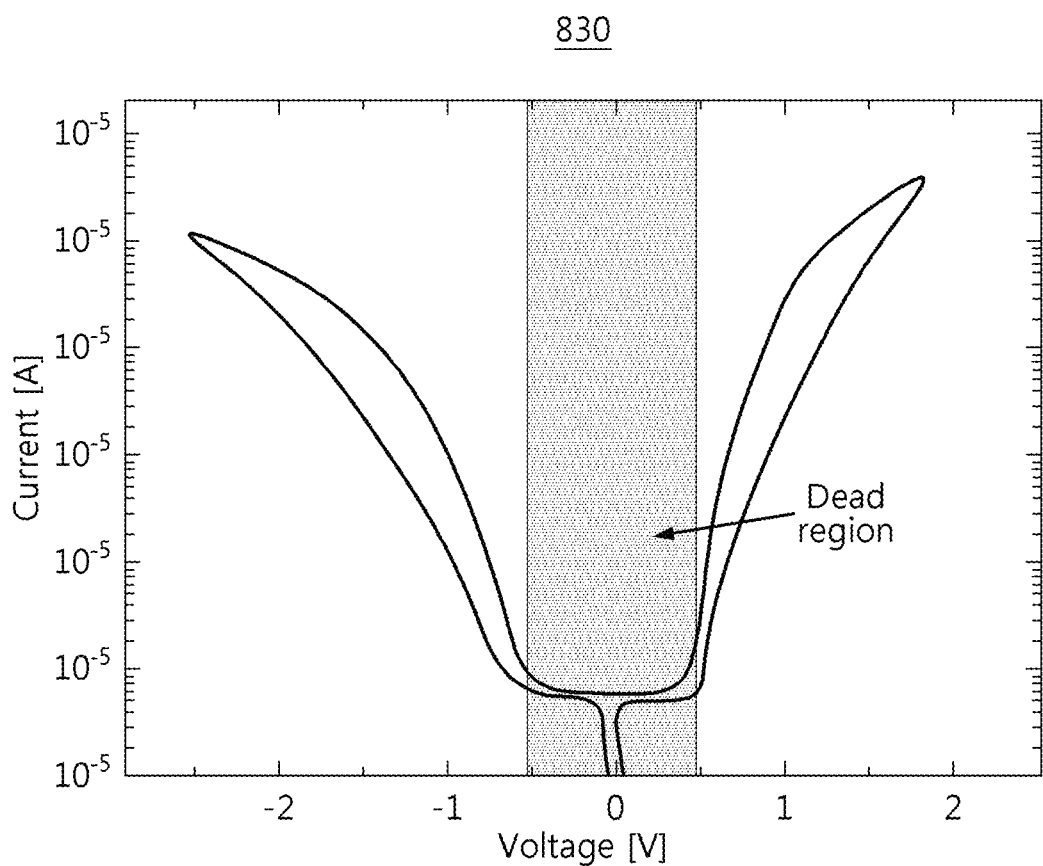

[FIG. 8D]
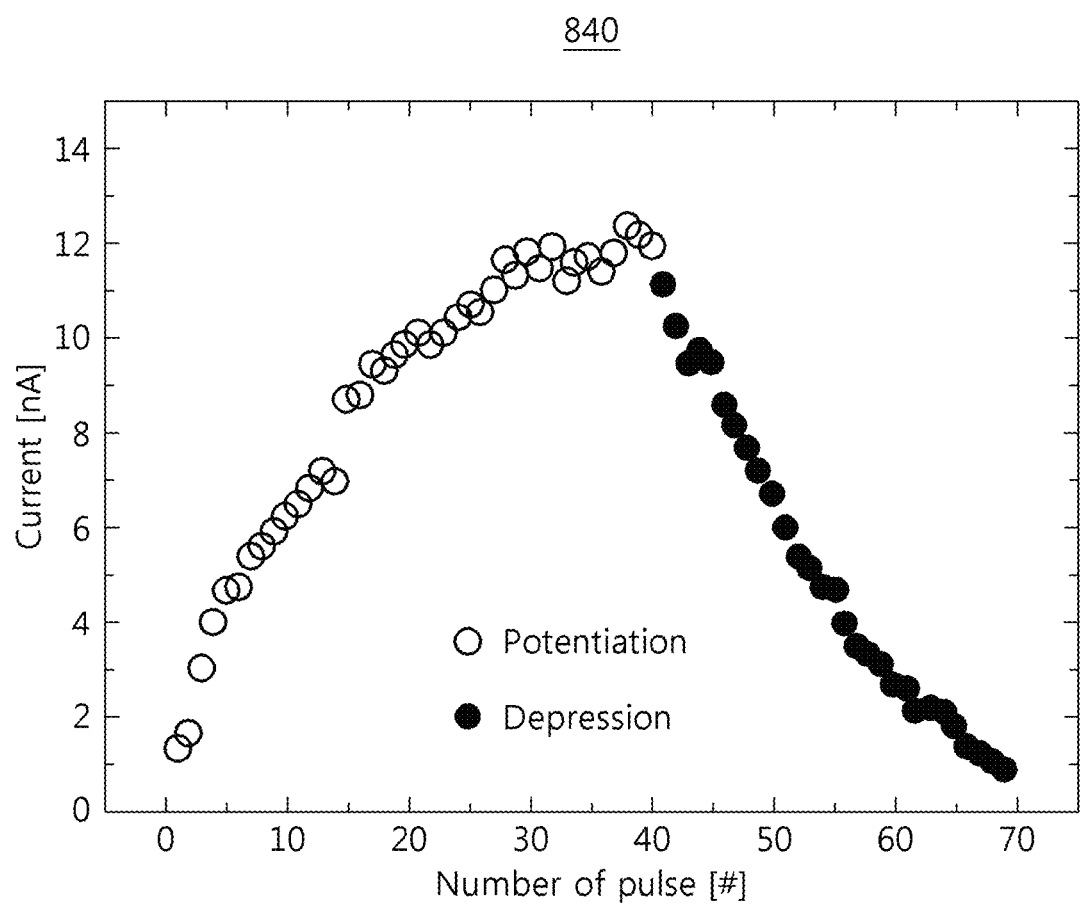

[FIG. 8E]
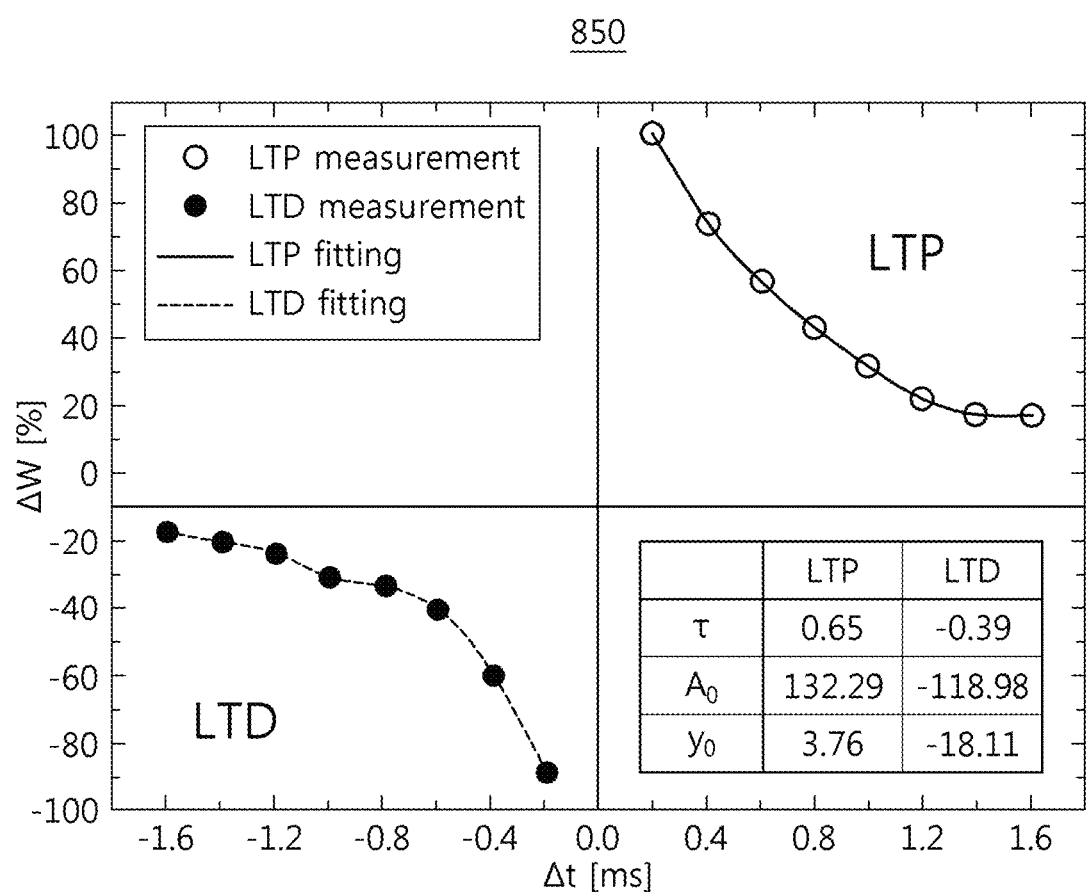

[FIG. 9A]
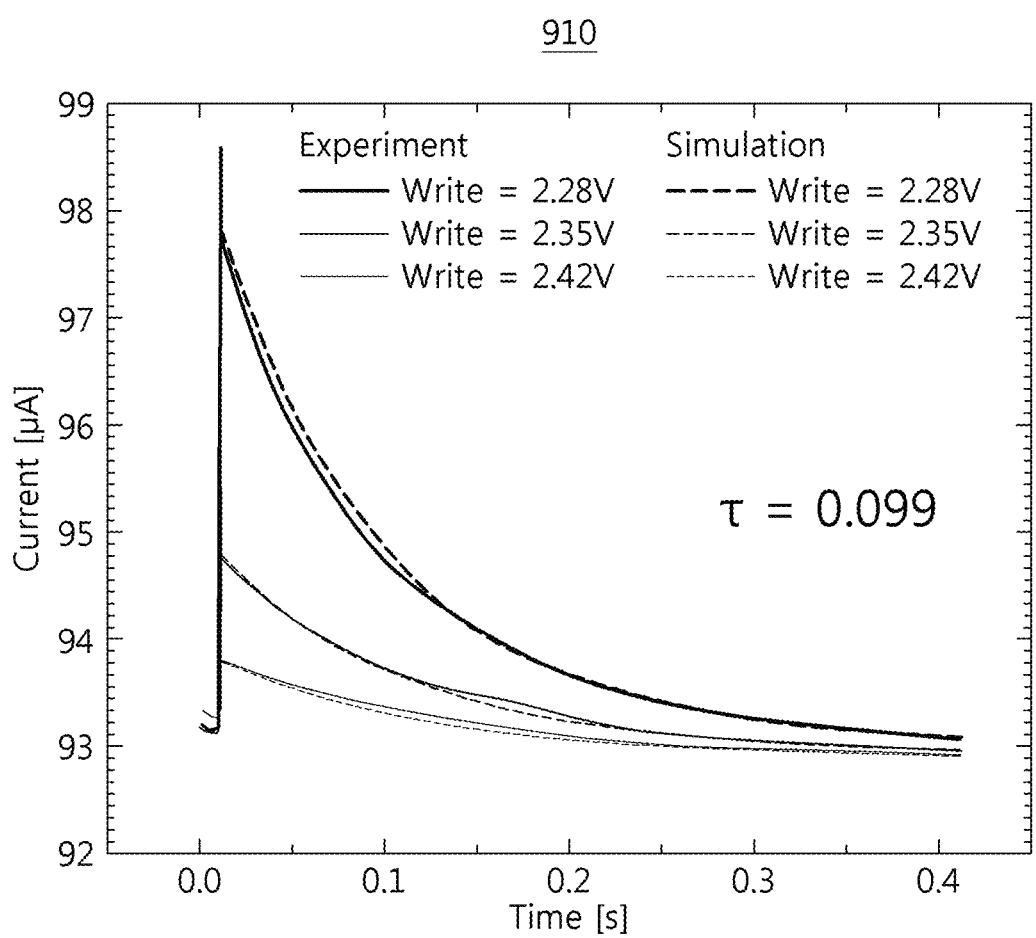

[FIG. 9B]
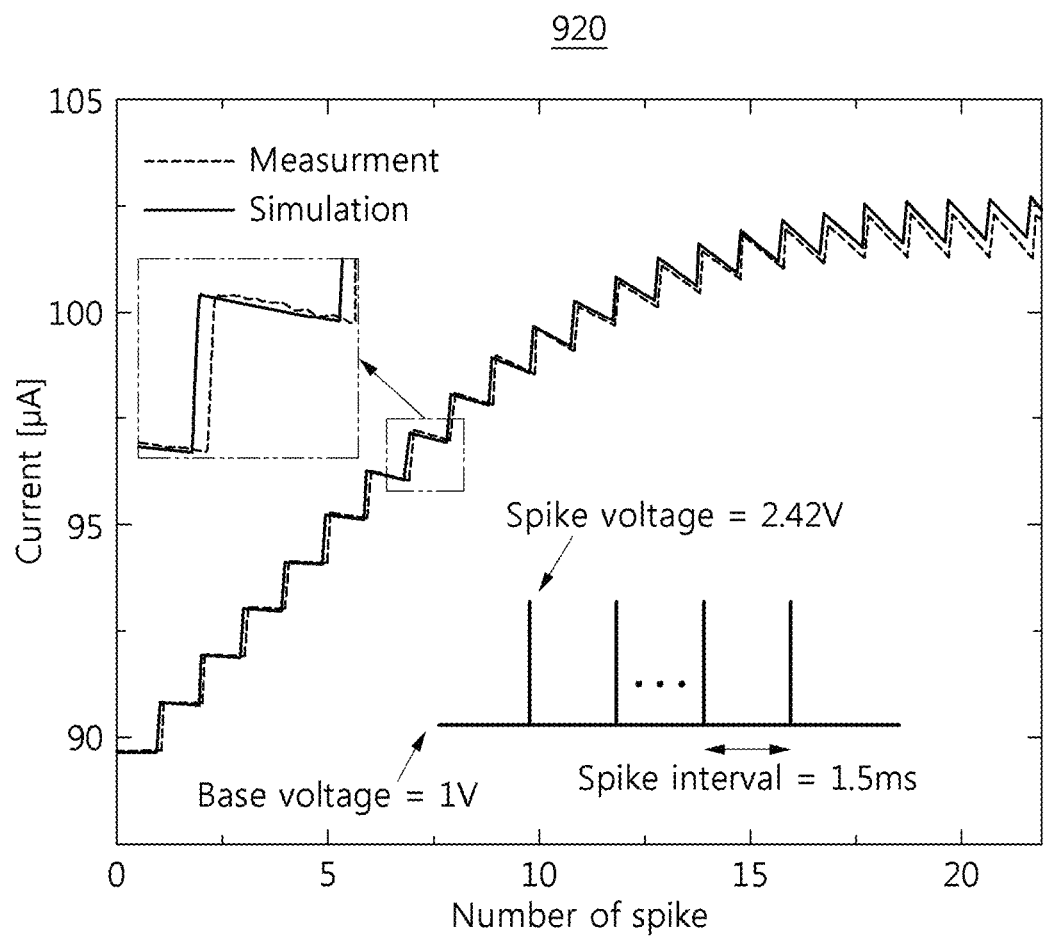

[FIG. 9C]
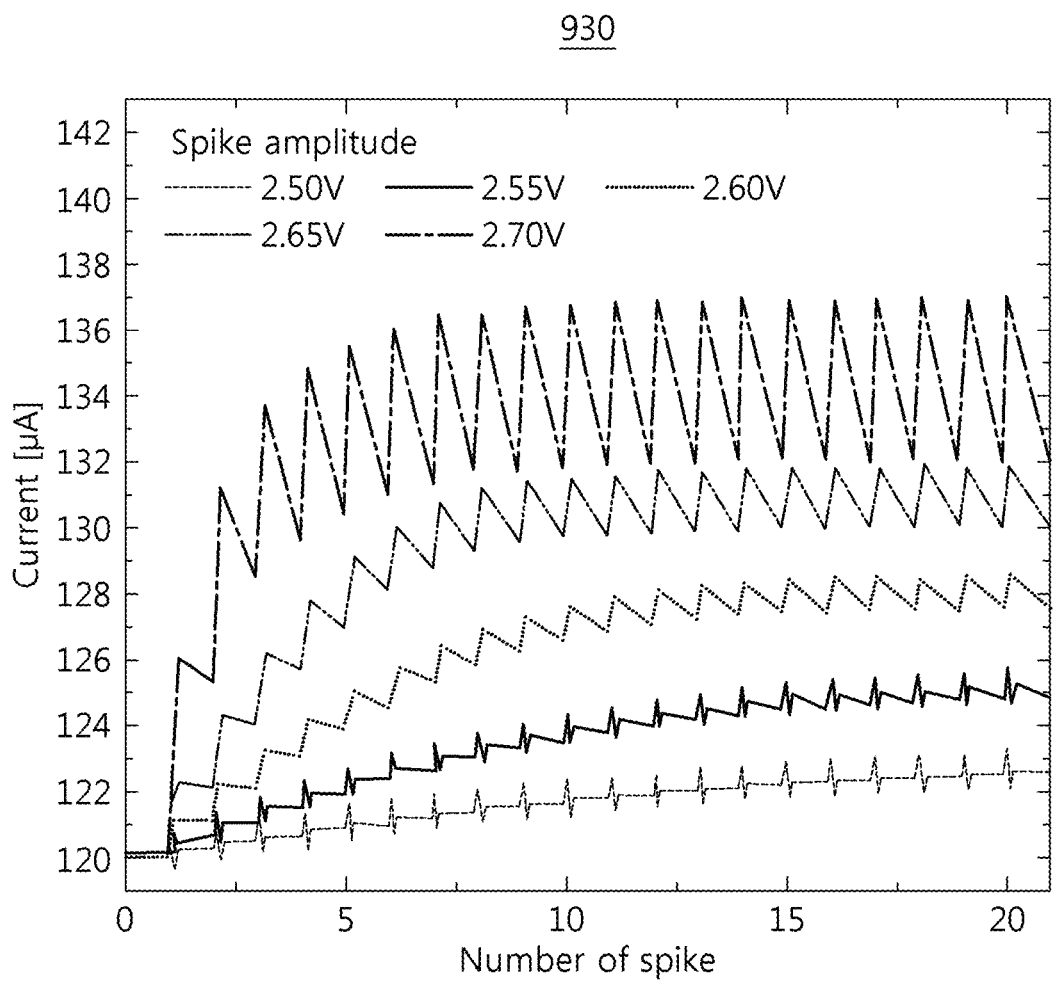

[FIG. 9D]
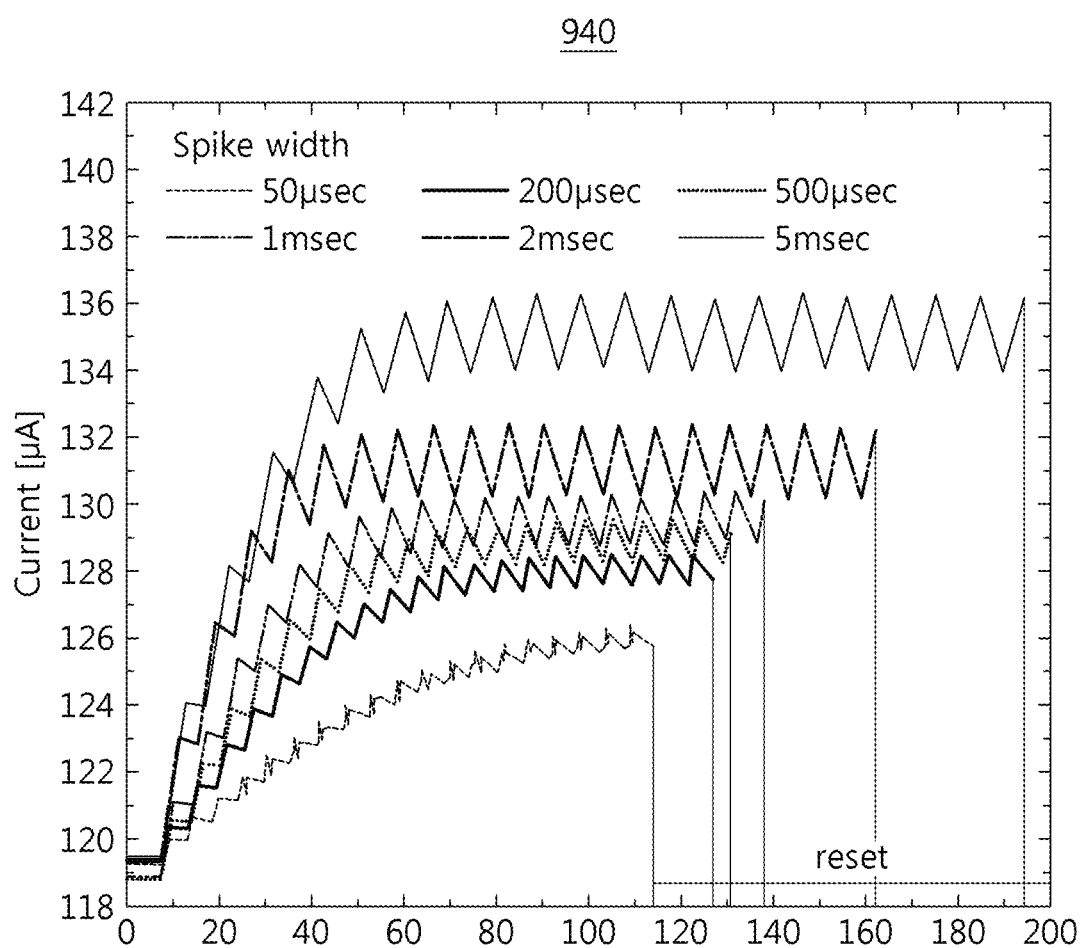

[FIG. 9E]
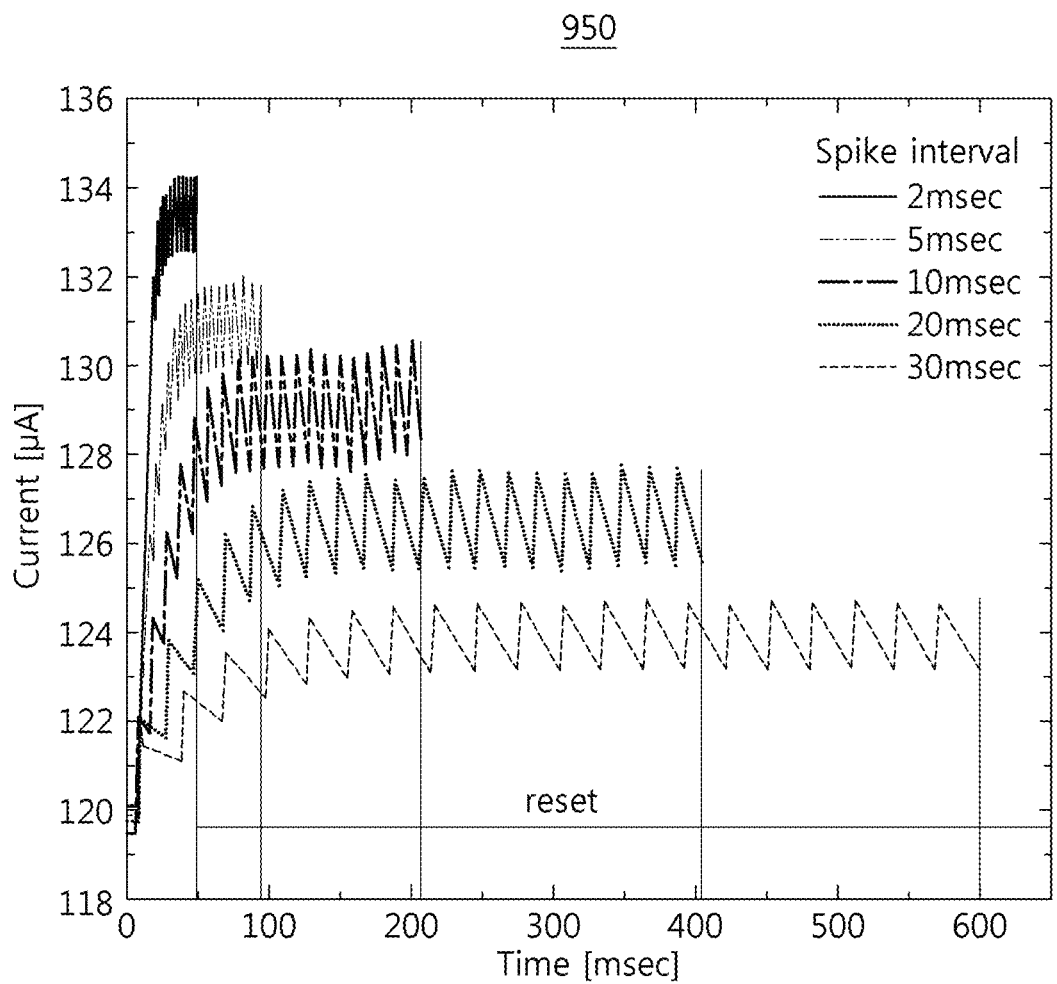

[FIG. 9F]
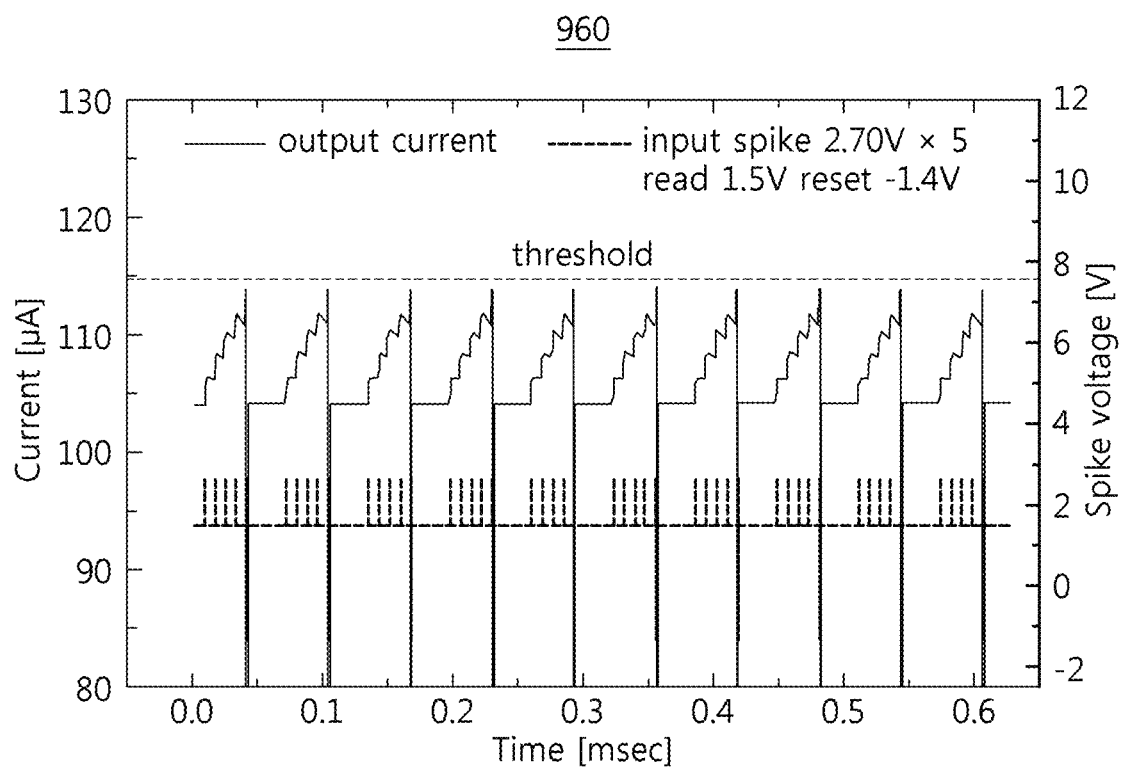

[FIG. 9G]
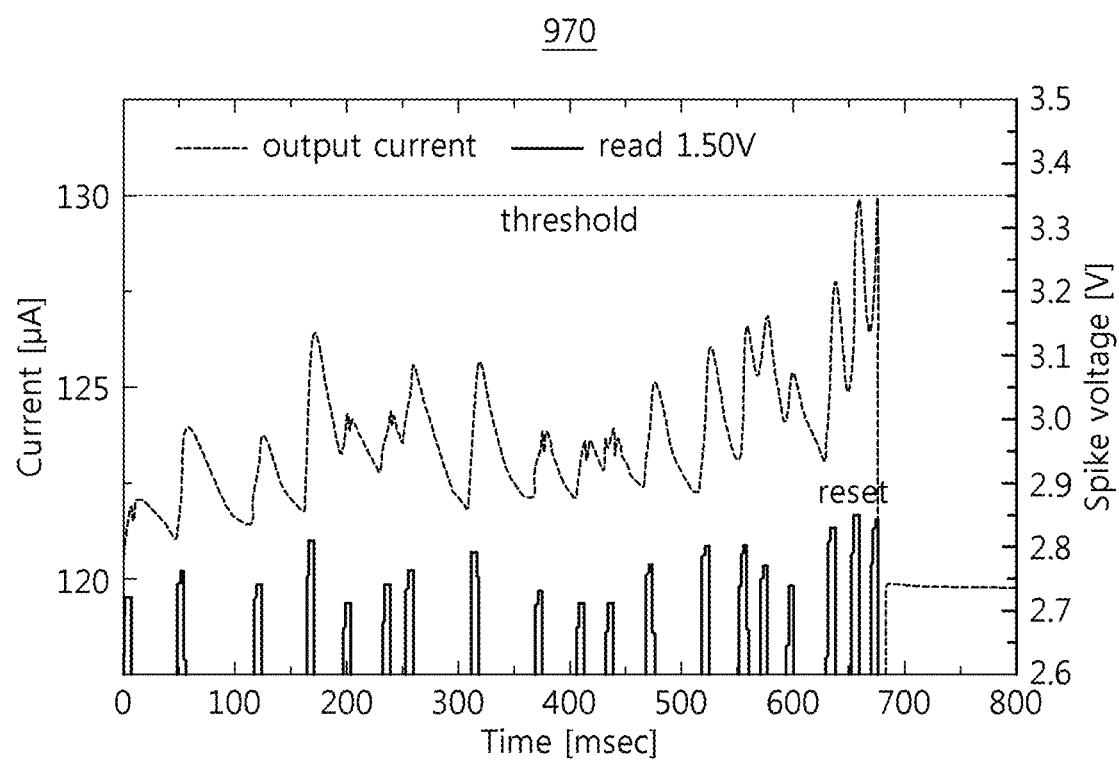

[FIG. 10]
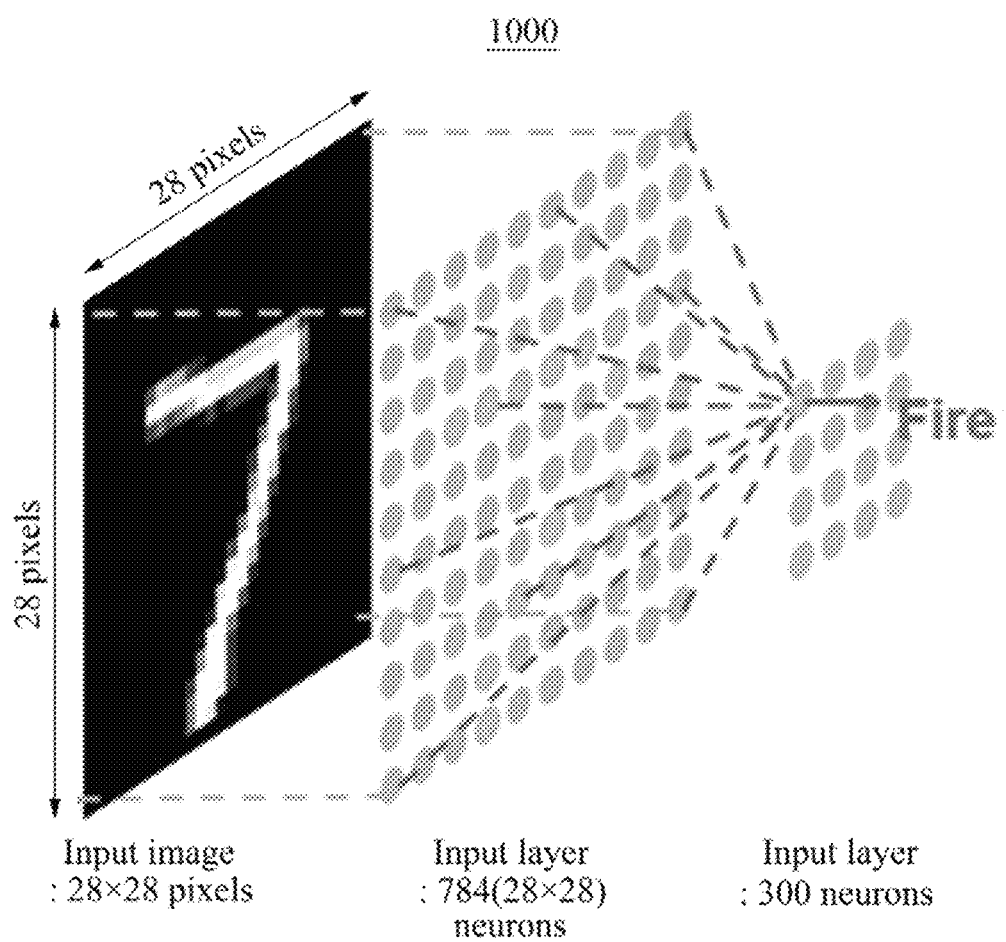

[FIG. 11A]
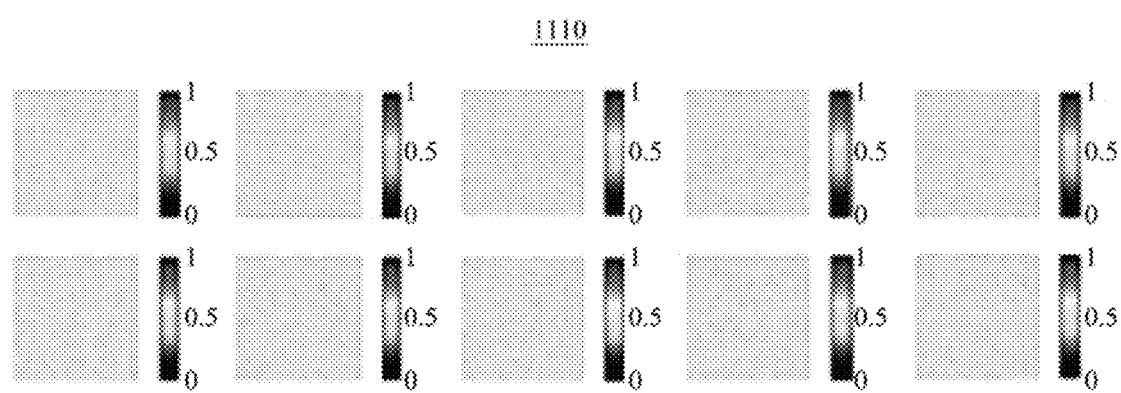

[FIG. 11B]
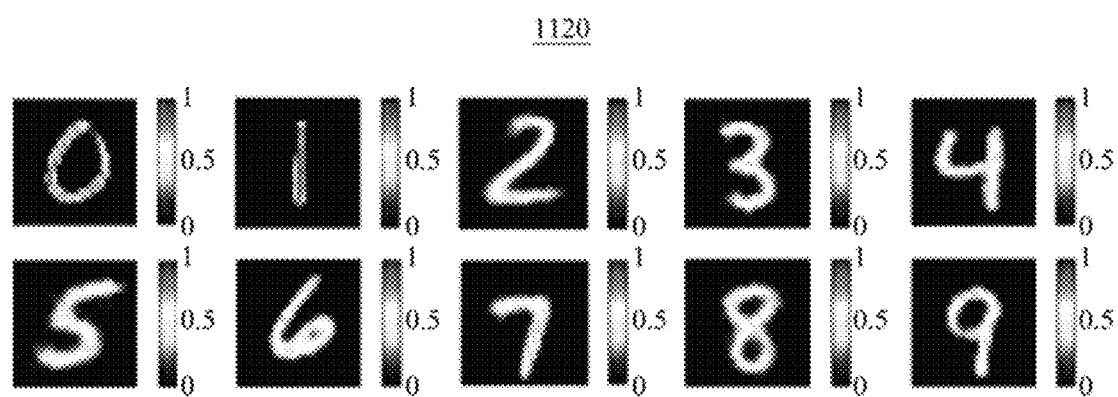

[FIG. 12]
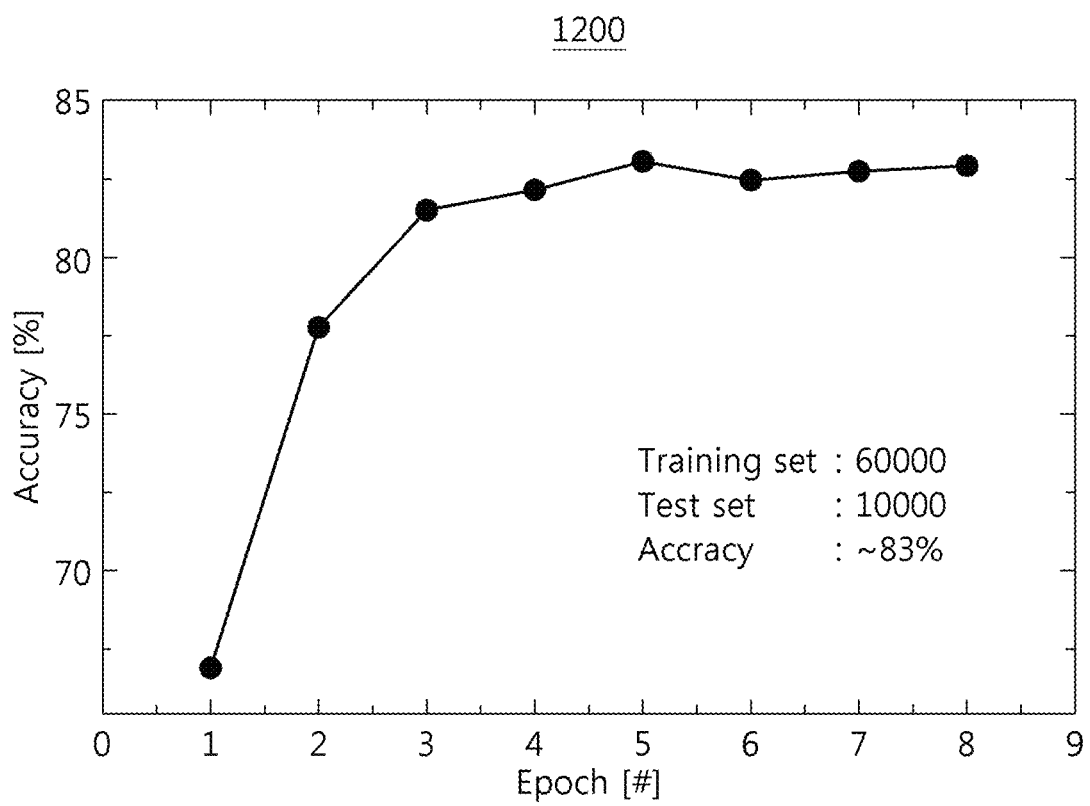

NEURON, NEUROMORPHIC SYSTEM INCLUDING THE SAME

CROSS-REFERENCE TO RELATED APPLICATION

This application is a National Stage Entry of PCT International Application No. PCT/KR2019/015004, which was filed on Nov. 6, 2019, and which claims priority to Korean Patent Application No. 10-2018-0165708, filed on Dec. 19, 2018 in the Korean Intellectual Property Office, the disclosure of which is incorporated herein by reference.

TECHNICAL FIELD

The present invention relates to at least one neuron and a neuromorphic system including the same, and more particularly to at least one neuron configured to perform integration and leakage, and a neuromorphic system including the neuron.

BACKGROUND ART

Recently, many attempts have been made to imitate the nervous system of animals as power consumption significantly increases and heat dissipation becomes a serious problem in integrated circuits based on the von Neumann architecture. In particular, the technology that mimics the nervous system of an animal can greatly reduce power consumption, has cognitive functions, and can perform learning, thereby being capable of improving recognition and judgment functions. Accordingly, interest in and research on the animal nervous system-mimicking technology that can replace or greatly improve the functions of existing integrated circuits adopting the von Neumann architecture are increasing.

The neuromorphic system can be implemented using the principle of nerve cells. The neuromorphic system refers to a system that implements neurons constituting the human brain using a plurality of devices and thus mimics data processing by the brain. Accordingly, data can be processed and learned in a manner similar to that of the brain by using the neuromorphic system containing neurons.

That is, neurons are connected to other neurons through synapses of neurons and can receive data from other neurons through synapses. Here, neurons accumulate and integrate the received data, and when the integrated data exceeds a threshold value (Vt), neurons fire and output the data.

That is, neurons serve to accumulate (integrate) and fire data. In addition, a synaptic device performs selective output according to an input value. That is, a synaptic device cumulates (potentiation) or decreases (depression) input data to deliver the same to neurons.

Conventionally, such neurons were fabricated based on C-MOSFET. The C-MOSFET-based neurons require a capacitor that is in charge of data accumulation (integration); and a comparator that fires when a signal equal to or higher than a certain threshold is applied, and are composed of additional circuits for delay and stability securement.

Meanwhile, since an area occupied by a capacitor is quite large, the total area of neurons greatly increases, and power consumption also greatly increases.

A capacitor is useful for simulating changes in the membrane potential of biological neurons, but if the capacitor's capacity is small, it is impossible to accumulate (integrate) the quantity of electric charge due to leakage current.

In general, the RC time constant required for neurons to operate is about a few ms. To obtain such an RC time constant, a capacitance of at least several hundred pF is required even if a high resistance of several tens of M ohm is used. However, since the current technology requires an area of $1000F^2$ or more to implement such an amount of capacitance, there is difficulty in implementing highly integrated artificial intelligence hardware using capacitor-based neurons.

Due to these structural limitations, the configuration of the neuromorphic system becomes complicated, and various problems such as limited precision occur.

DISCLOSURE

Technical Problem

Therefore, the present invention has been made in view of the above problems, and it is one object of the present invention to provide a neuron including a completely depleted SOI device to remove a capacitor, thereby being capable of providing improved integration.

It is another object of the present invention to provide a neuron including the completely depleted SOI device that performs integration and leakage, thereby being capable of satisfying the RC time constant conditions for operation as a neuron.

It is still another object of the present invention to provide a neuromorphic system provided with a neuron that includes the completely depleted SOI device performing integration and leakage, thereby being used in an artificial intelligence system capable of performing learning and logical thinking.

Technical Solution

In accordance with an aspect of the present invention, the above and other objects can be accomplished by the provision of a neuron, including a completely depleted Silicon-On-Insulator (SOI) device, wherein a depletion region of the SOI device is controlled according to an inputted electrical signal to perform integration and leakage.

The electrical signal inputted through at least one synapse may be accumulated in the form of a potential to perform the integration.

The leakage may be performed within an interval time section that is a section from a time at which the electrical signal is input to a time at which a next electrical signal is input.

The completely depleted SOI device is an NMOS transistor device that includes: a substrate with a Silicon On Insulator (SOI) structure that sequentially includes a first semiconductor layer; a buried insulating layer; and a second semiconductor layer used as a channel layer; a gate insulating film formed on the second semiconductor layer; a gate electrode formed on the gate insulating film; and a source region and drain region disposed on opposite side of the gate electrode and formed to be spaced apart from each other in the second semiconductor layer.

The second semiconductor layer may be formed to a thickness of 3 nm to 100 nm.

The second semiconductor layer may include at least one of silicon, strained silicon and relaxed silicon-germanium (SiGe).

The electrical signal may be input through the drain region.

In accordance with another aspect of the present invention, there is provided a neuromorphic system, including: at least one pre-neuron; at least one synapse electrically connected to the pre-neuron; and at least one post-neuron electrically connected to the synapse and configured to include a completely depleted Silicon-On-Insulator (SOI) device, wherein the post-neuron performs integration and leakage.

A depletion region of the post-neuron may be controlled according to an inputted electrical signal (spike) to perform the integration and the leakage.

The synapse may have a cross-bar array structure.

The synapse may include a memristor and a selection element.

The neuromorphic system may further include an adder.

Advantageous Effects

In accordance with an embodiment of the present invention, provided is a neuron including a completely depleted SOI device to remove a capacitor, thereby being capable of providing improved integration.

In accordance with an embodiment of the present invention, provided is a neuron including the completely depleted SOI device that performs integration and leakage, thereby being capable of satisfying the RC time constant conditions for operation as a neuron.

In accordance with an embodiment of the present invention, provided is a neuromorphic system provided with a neuron that includes the completely depleted SOI device performing integration and leakage, thereby being used in an artificial intelligence system capable of performing learning and logical thinking.

DESCRIPTION OF DRAWINGS

FIGS. 1A and 1B are a schematic diagram and graph illustrating a neuron and a leaky integration and fire (LIF) operation.

FIG. 2 is a block diagram illustrating a neuron according to an embodiment of the present invention.

FIG. 3 illustrates a sectional view of a completely depleted SIM device included in a neuron according to an embodiment of the present invention.

FIG. 4 is a schematic diagram illustrating a cross-bar array structure of a neuromorphic system according to an embodiment of the present invention.

FIG. 5 illustrates a block diagram of a neuromorphic system according to an embodiment of the present invention.

FIG. 6 is a sectional view illustrating a memristor of a synapse included in a neuromorphic system according to an embodiment of the present invention.

FIG. 7 is a sectional view illustrating a selection element of a synapse included in a neuromorphic system according to an embodiment of the present invention.

FIGS. 8A to 8E are graphs illustrating electrical characteristics of a synapse included in a neuromorphic system according to an embodiment of the present invention.

FIGS. 9A to 9G illustrate electrical characteristics of a completely depleted SOI device included in a neuron according to an embodiment of the present invention.

FIG. 10 illustrates a schematic diagram of a single-layer spiking neural network (SNN).

FIGS. 11A to 11B illustrate the weights of synapses.

FIG. 12 illustrates the accuracy of image recognition depending upon the number of learning.

BEST MODE

The present invention will now be described more fully with reference to the accompanying drawings and contents disclosed in the drawings. However, the present invention should not be construed as limited to the exemplary embodiments described herein.

The terms used in the present specification are used to explain a specific exemplary embodiment and not to limit the present inventive concept. Thus, the expression of singularity in the present specification includes the expression of plurality unless clearly specified otherwise in context. It will be further understood that the terms "comprise" and/or "comprising", when used in this specification, specify the presence of stated components, steps, operations, and/or elements, but do not preclude the presence or addition of one or more other components, steps, operations, and/or elements thereof.

It should not be understood that arbitrary aspects or designs disclosed in "embodiments", "examples", "aspects", etc. used in the specification are more satisfactory or advantageous than other aspects or designs.

In addition, the expression "or" means "inclusive or" rather than "exclusive or". That is, unless otherwise mentioned or clearly inferred from context, the expression "x uses a or b" means any one of natural inclusive permutations.

In addition, as used in the description of the invention and the appended claims, the singular forms "a", "an" and "the" are intended to include the plural forms as well, unless context clearly indicates otherwise.

Although terms used in the specification are selected from terms generally used in related technical fields, other terms may be used according to technical development and/or due to change, practices, priorities of technicians, etc. Therefore, it should not be understood that terms used below limit the technical spirit of the present invention, and it should be understood that the terms are exemplified to describe embodiments of the present invention.

Also, some of the terms used herein may be arbitrarily chosen by the present applicant. In this case, these terms are defined in detail below. Accordingly, the specific terms used herein should be understood based on the unique meanings thereof and the whole context of the present invention.

Meanwhile, terms such as "first" and "second" are used herein merely to describe a variety of constituent elements, but the constituent elements are not limited by the terms. The terms are used only for the purpose of distinguishing one constituent element from another constituent element.

In addition, when an element such as a layer, a film, a region, and a constituent is referred to as being "on" another element, the element can be directly on another element or an intervening element can be present.

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the relevant art and the present invention, and will not be interpreted in an idealized or overly formal sense unless expressly so defined herein.

Meanwhile, in the following description of the present invention, a detailed description of known functions and configurations incorporated herein will be omitted when it may make the subject matter of the present invention unclear. The terms used in the specification are defined in consideration of functions used in the present invention, and can be changed according to the intent or conventionally used methods of clients, operators, and users. Accordingly, definitions of the terms should be understood on the basis of the entire description of the present specification.

FIGS. 1A and 1B are a schematic diagram and graph illustrating a neuron and a leaky integration and fire (LIF) operation.

Referring to an LIF graph 100b of FIGS. 1A and 1B, when electrical signals are input to a neuron 200 through the synapses 110 and 130 in a neural network 100a, the neuron 200 performs LIF operations so that the electrical signals (input spikes) introduced from an adjacent neuron 200 are accumulated (integrated) in the form of a membrane potential. When the membrane potential reaches a specific threshold, fire occurs to send electrical signals (output spikes) to adjacent neurons 200.

Conventionally, a capacitor was necessarily required to simulate accumulation (integration) in a neural network using basically a complementary metal oxide semiconductor (CMOS) as a neuron 200.

A capacitor stores an electrical signal that is input to the neuron 200 in the form of electric charge, the stored electric charge generates a potential difference between both ends of the capacitor, and a neuron circuit senses the potential difference and, when the potential difference reaches or exceeds a specific value, determines to fire, thereby emitting the electrical signal to an adjacent neuron 200.

Such a capacitor can be usefully used to simulate membrane potential changes in biological neurons. However, when the capacitance of the capacitor is small, it is impossible to accumulate electric charge due to leakage current.

In general, the RC time constant required for the neuron 200 to operate is about several ms, and so as to obtain this level of RC time constant value, a capacitance of at least several hundred pF is required even if a high resistance of several tens of M ohm is used. In addition, to realize a capacitance of at least several hundred pF, an area of $1000F^2$ or more is required. Accordingly, it is difficult to realize artificial intelligence hardware, which requires high integration, using neurons including a capacitor.

Hereinafter, a neuron according to an embodiment of the present invention is described in detail.

FIG. 2 is a block diagram illustrating a neuron according to an embodiment of the present invention.

Referring to FIG. 2, a neuron 200 according to an embodiment of the present invention may include a completely depleted Silicon-On-Insulator (SOI) device, a depletion region of which is controlled according to an electrical signal (spike) as an input signal to perform integration and leakage.

The neuron 200 according to an embodiment of the present invention may be electrically connected to at least one synapse, and an electrical signal that is input through the synapse may be accumulated in the form of a potential to perform integration.

More particularly, in the case of the completely depleted SOI device included in the neuron 200 according to an embodiment of the present invention, an insulator is present between a support substrate and a device to form a depletion region in which holes are accumulated according to an electrical signal to be input. Here, the operation wherein holes are accumulated in the depletion region may be determined as an integration operation.

Meanwhile, the neuron 200 according to an embodiment of the present invention may further include a controller. The controller serves to monitor the amount of current flowing through the completely depleted SOI device to determine an integration operation wherein holes are accumulated in a depletion region.

In addition, the controller may determine to fire when the amount of a monitored current reaches a threshold value to emit an electrical signal as an output signal to another neuron through at least one adjacent synapse and control a reset operation for re-initialization of a formed depletion region.

The neuron 200 according to an embodiment of the present invention may perform leakage within an interval time section that is a section from a time at which an electrical signal is input through at least one synapse to a time at which a next electrical signal is input.

In other words, the neuron 200 according to an embodiment of the present invention may perform leakage in interval time sections that are time sections, except for time sections at which respective electrical signals are input, among time sections at which an electrical signal that is input through at least one synapse is accumulated in the form of a potential, i.e., an integration operation is performed.

FIG. 3 illustrates a sectional view of a completely depleted SOI device included in a neuron according to an embodiment of the present invention.

Referring to FIG. 3, a completely depleted SOI device 300 may be an NMOS transistor device.

In particular, the completely depleted SOI device 300 may include a substrate with the Silicon On Insulator (SOI) structure sequentially including a first semiconductor layer 310; a buried insulating layer 320; and a second semiconductor layer 330 used as a channel layer.

In addition, the completely depleted SOI device 300 may further include a gate insulating film 340 formed on the second semiconductor layer 330; a gate electrode 350 formed on the gate insulating film 340; and a source region 360 and drain region 370 disposed on opposite sides of the gate electrode 350 and formed to be spaced apart from each other in the second semiconductor layer 330.

For example, the SOI structure substrate may be formed by implanting hydrogen ions into the second semiconductor layer 330 using an ion implantation method to form an embrittlement region at a predetermined depth from a surface thereof and by bonding the second semiconductor layer 330, into which hydrogen ions have been implanted, to a separate first semiconductor layer 310 through the buried insulating layer 320.

In addition, the gate insulating film 340 may be formed of any one material of an inorganic insulating film, an organic insulating film, a dual structure of an inorganic insulating film, and an organic/inorganic hybrid insulating film. When the gate insulating film 340 is formed of an organic insulating film material, a spin coating method may be used.

Preferably, the gate insulating film 340 may be formed of any one of, for example, aluminum oxide ($Al_2O_3$), silicon oxide ($SiO_2$), hafnium oxide ($HfO_2$) and zirconium oxide ($ZrO_2$).

In addition, the gate insulating film 340 may include at least one of amorphous Si, polycrystalline Si and single crystalline Si.

In general, a channel region of an SOI-based transistor may be completely depleted or partially depleted depending upon the thickness of a semiconductor channel layer. When the thickness of a channel layer is thin, the channel region may be completely depleted, and when the thickness of a channel layer is thick, the channel region may be partially depleted. When completely depleted, there is an advantage in terms of the control force of a gate.

Preferably, the second semiconductor layer 330 of the completely depleted SOI device 300 may be formed to a thickness of 3 nm to 100 nm.

In addition, the second semiconductor layer 330 may include at least one material of silicon, strained silicon and relaxed silicon-germanium (SiGe).

Preferably, the second semiconductor layer 330 may be formed of a relaxed silicon-germanium material.

In particular, a transistor to which strained silicon or relaxed silicon-germanium is applied is advantageous in that electron mobility thereof is higher than that of a transistor to which silicon is applied, and a transistor to which relaxed silicon-germanium is applied is advantageous in that hole retention is additionally prolonged.

Meanwhile, an electrical signal (spike) that is input to the neuron according to an embodiment of the present invention through at least one synapse may be input to the drain region 370.

In particular, in the completely depleted SOI device 300, holes may not escape through the first semiconductor layer 310 due to the buried insulating layer 320 and may be accumulated at an end of the source region 360 to form a depletion region, when a gate voltage of a predetermined level is applied to the gate electrode 350 and an electrical signal is applied to the drain region 370.

The amount of holes accumulated at the depletion region depends upon the voltage level and pulse width of an electrical signal applied to the drain region 370, and a threshold voltage value may be gradually decreased according to the amount of holes.

The neuron according to an embodiment of the present invention may determine the operation of accumulating holes at a depletion region of the completely depleted SOI device 300, as an integration operation.

In particular, the neuron according to an embodiment of the present invention may further include a controller. The controller may monitor the amount of drain current flowing through the completely depleted SOI device to determine the integration operation wherein holes are accumulated in the depletion region.

In addition, the controller may determine to fire when the amount of monitored drain current reaches a threshold value to emit an electrical signal, as an output signal, to another neuron through at least one adjacent synapse, and, to re-initialize the formed depletion region, may control the reset operation of applying the predetermined reset voltage to the completely depleted SOI device 300.

For example, the controller may control a reset operation while emitting an output signal. The reset operation may be an operation of applying the predetermined reset voltage to the gate electrode 350 to remove the formed depletion region.

Preferably, the controller may determine that the amount of drain current has reached a threshold value upon determining that the amount of drain current reaches a saturation region and does not increase any more.

FIG. 4 is a schematic diagram illustrating a cross-bar array structure of a neuromorphic system according to an embodiment of the present invention.

The von Neumann structure wherein a central processing unit (CPU) and a memory are separated and data transfer between the CPU and the memory is performed through a bus is generally used in computers. Such a von Neumann structure has the advantage that a desired operation can be performed only by software programming without reconstruction of hardware according to a user's desired task, but has a disadvantage in that bandwidth between the CPU and the memory is low.

In particular, deep learning, which has recently attracted attention in the field of artificial intelligence, requires large-scale parallel processing, and when deep learning is implemented in the von Neumann structure, efficiency in terms of data processing, transmission speed, and energy consumption decreases due to the von Neumann bottleneck.

Thus, in tasks that require large-scale parallel computing such as in the field of artificial intelligence, the need for an efficient new hardware structure is increasing, and a neuromorphic architecture that mimics the human brain is being proposed as an alternative.

Therefore, the neuromorphic system according to an embodiment of the present invention forms a cross-bar array structure 400 to realize a neural network structure composed of neurons according to an embodiment of the present invention and connection between the neurons, thereby being capable of realizing artificial intelligence hardware with improved efficiency in terms of data processing, transmission speed, and energy consumption due to operation through interaction between the neurons according to an embodiment of the present invention.

FIG. 5 illustrates a block diagram of a neuromorphic system according to an embodiment of the present invention.

Referring to FIG. 5, at least one pre-neuron 510 and at least one post-neuron 530 included in the neuromorphic system according to an embodiment of the present invention use the neuron according to an embodiment of the present invention. Thus, description of the same components is omitted.

The neuromorphic system according to an embodiment of the present invention includes the pre-neuron 510; at least one synapse 520 electrically connected to the pre-neuron 510; and the post-neuron 530 electrically connected to the synapse 520 and configured to include a completely depleted Silicon-On-Insulator (SOI) device. Here, the post-neuron 530 performs integration and leakage.

The post-neuron 530 may perform integration and leakage because a depletion region is controlled according to an inputted electrical signal (spike).

In particular, in the completely depleted SOI device included in the post-neuron 530, a depletion region at which holes are accumulated according to an inputted electrical signal may be formed because an insulator is present between a support substrate and the device. In addition, the operation wherein holes are accumulated in the depletion region may be determined as an integration operation.

More particularly, the post-neuron 530 may further include a controller. The controller may determine the integration operation, wherein holes are accumulated at the depletion region, by monitoring the amount of current flowing through the completely depleted SOI device.

In addition, the controller may determine to fire when the amount of the monitored current reaches a threshold value to emit the electrical signal, and may control a reset operation for re-initialization of the formed depletion region.

Meanwhile, the post-neuron 530 may perform leakage within an interval time section that is section from a time when an electrical signal is input through at least one or more synapses to a time when a next electrical signal is input.

In other words, the neuron 200 according to an embodiment of the present invention may perform leakage within an interval time section, except for times at which respective electrical signals are inputted, among a time section in which an integration operation wherein electrical signals inputted through the synapse 520 are accumulated in the form of a potential is performed.

In addition, the synapse 520 may have a cross-bar array structure and may include a memristor and a selection element.

In other words, the synapse 520 included in the neuromorphic system 500 according to an embodiment of the present invention may include a selection element, so that the synapse 520 with the cross-bar array structure can suppress sneak current.

The memristor and selection element included in the synapse 520 are described with reference to FIGS. 6 and 7.

Meanwhile, the neuromorphic system according to an embodiment of the present invention may further include an adder to be arranged between the synapse 520 and the post-neuron 530.

When a plurality of electrical signals are input from the synapse 520, the adder may add the inputted electrical signals and may transmit the added electrical signals to input of the post-neuron 530.

FIG. 6 is a sectional view illustrating a memristor of a synapse included in a neuromorphic system according to an embodiment of the present invention, and FIG. 7 is a sectional view illustrating a selection element of a synapse included in a neuromorphic system according to an embodiment of the present invention.

The synapse included in the neuromorphic system according to an embodiment of the present invention may include a memristor 660 and a selection element 760. In FIGS. 6 and 7, the memristor 660 and the selection element 760 are separately illustrated for detailed description, but the memristor 660 and the selection element 760 may be connected in series.

In addition, a first electrode 620 of the memristor 660 may be electrically connected to a pre-neuron through wiring 620 formed in interlayer insulating layers 610, 630, and 640, a second electrode 662 of the memristor 660 may be electrically connected to the selection element 760, and the selection element 760 may be electrically connected to a post-neuron through wiring.

Alternatively, a first electrode 720 of the selection element 760 may be electrically connected to a pre-neuron through wiring 720 formed in interlayer insulating layers 710, 730, and 740, a second electrode 767 of the selection element 760 may be electrically connected to the memristor 660, and the memristor 660 may be electrically connected to a post-neuron through wiring.

In addition, when the selection element 760 of the synapse included in the neuromorphic system according to an embodiment of the present invention is turned on, an electrical signal may be provided to the memristor 660. The electrical signal may learn the memristor 660 to adjust the resistance state of the memristor 660, or may be converted into a current value according to the resistance state of the memristor 660. That is, the resistance state of the memristor 660 may be changed by an electrical signal, or a current value according to the resistance state of the memristor 660 may be outputted by an electrical signal.

Referring to FIG. 6, the memristor 660 of the synapse included in the neuromorphic system according to an embodiment of the present invention may include the first electrode 620, an insulating layer 661 and the second electrode 662, and the wiring 620 may be used as the first electrode 620 of the memristor 660 while being used as a contact.

The first and second electrodes 620 and 662 of the memristor 660 may be formed of impurity-doped polysilicon, metal, conductive metal nitride or a combination thereof. For example, the first and second electrodes 620 and 662 of the memristor 660 may be formed of W, Pt, WN, Au, Ag, Cu, Al, TiAlN, Ir, Pt, Pd, Ru, Zr, Rh, Ni, Co, Cr, Sn, Zn, ITO, an alloy thereof or a combination thereof.

In addition, the first and second electrodes 620 and 662 of the memristor 660 may be formed of the same material or different materials.

The insulating layer 661 may include a material whose resistance is changed into a high resistance state and a low resistance state according to a voltage applied from the outside. For example, the insulating layer 661 may include a metal oxide such as amorphous carbon oxide ($\alpha$-COx), titanium oxide, aluminum oxide, nickel oxide, copper oxide, zirconium oxide, manganese oxide, hafnium oxide, tungsten oxide, tantalum oxide, niobium oxide or iron oxide.

Referring to FIG. 7, the selection element 760 of the synapse included in the neuromorphic system according to an embodiment of the present invention may include switch layers 761 and 765 formed between the first electrode 720 and the second electrode 767, a metal-doped switch layer 763, and at least one diffusion suppression layer 762, 764 and 766 bonded to at least a portion of surfaces of the switch layers 761 and 765 and the metal-doped switch layer 763.

In addition, the selection element 760 may include at least one of the switch layers 761 and 765 formed between the first electrode 720 and the second electrode 767; and the metal-doped switch layer 763.

For example, the selection element 760 the synapse included in the neuromorphic system according to an embodiment of the present invention may include the first electrode 720, a first switch layer 761, a first diffusion suppression layer 762, the metal-doped switch layer 763, a second diffusion suppression layer 764, a second switch layer 765, a third diffusion suppression layer 766 and the second electrode 767 which are sequentially laminated.

Alternatively, the selection element 760 of the synapse included in the neuromorphic system according to an embodiment of the present invention may include a first metal-doped switch layer, a first diffusion suppression layer, a first switch layer, a second diffusion suppression layer, a second metal-doped switch layer, a third diffusion suppression layer and a second electrode which are sequentially laminated.

Alternatively, the selection element 760 of the synapse included in the neuromorphic system according to an embodiment of the present invention may include a first metal-doped switch layer, a first diffusion suppression layer, a first switch layer, a second diffusion suppression layer, the second metal-doped switch layer, a third diffusion suppression layer, a second switch layer, a fourth diffusion suppression layer, a third metal-doped switch layer, a fourth diffusion suppression layer and a second electrode which are sequentially laminated.

The first and second electrodes 720 and 767 of the selection element 760 may be formed of impurity-doped polysilicon, metal, conductive metal nitride or a combination thereof. For example, the first and second electrodes 720 and 767 of the selection element 760 may be formed of W, Pt, WN, Au, Ag, Cu, Al, TiAlN, Ir, Pt, Pd, Ru, Zr, Rh, Ni, Co, Cr, Sn, Zn, ITO, an alloy thereof or a combination thereof.

The switch layers 761 and 765 may include at least one chalcogen element selected from tellurium (Te), selenium (Se) and sulfur (S). In addition, the switch layers 761 and 765 may further include at least one element selected from boron (B), aluminum (Al), gallium (Ga), carbon (C), silicon (Si), germanium (Ge), nitrogen (N), phosphorus (P), arsenic (As), antimony (Ab) and bismuth (Bi).

Preferably, the switch layers 761 and 765 may include germanium selenide (GeSe).

The metal-doped switch layer 763 may include at least one chalcogen element selected from tellurium (Te), selenium (Se) and sulfur (S). In addition, the metal-doped switch layer 763 may further include at least one element selected from boron (B), aluminum (Al), gallium (Ga), carbon (C), silicon (Si), germanium (Ge), nitrogen (N), phosphorus (P), arsenic (As), antimony (Ab) and bismuth (Bi).

In addition, a metal to doped on the metal-doped switch layer 763 may include copper (Cu) or silver (Ag).

Preferably, the metal-doped switch layer 763 may include Cu-doped germanium selenide (CuGeSe).

As the diffusion suppression layer 762, 764 and 766, a metal nitride, preferably titanium nitride (TiN), may be used.

In general, in the selection element 760, metal cations may diffuse or drift into the lower metal-doped switch layer 763 when a positive voltage is applied to the first electrode 720 or the second electrode 767, and metal cations diffuse or drift into the upper metal-doped switch layer 763 when a negative voltage is applied to the first electrode 720 or the second electrode 767.

Thus, even if a positive or negative voltage is applied to the first electrode 720 or the second electrode 767, a strong metal filament is not formed in a selection element 700.

However, since the selection element 700 of the synapse included in the neuromorphic system according to an embodiment of the present invention includes the diffusion suppression layer 762, 764 and 766, a threshold voltage (Vth) of ~0.65 V and a selection ratio of $10^7$ or more may be realized by intentionally adjusting the concentration distribution of metal cations.

In particular, the selection element 700 of the synapse included in the neuromorphic system according to an embodiment of the present invention includes the diffusion suppression layer 762, 764 and 766 formed to bonded to at least a portion of surfaces of the metal-doped switch layer 763 and the metal-doped switch layer 763, thereby forming the concentration of copper cations at the metal-doped switch layer 763 to be the highest and lowering the concentration of copper cations at the switch layers 761 and 765. Thus, a copper cation concentration difference between the metal-doped switch layer 763 and the switch layers 761 and 765 increases, thereby improving a selection ratio.

FIGS. 8A to 8E are graphs illustrating electrical characteristics of a synapse included in a neuromorphic system according to an embodiment of the present invention.

Referring to FIGS. 8A to 8E, reference numeral 810 illustrates a current-voltage characteristic of a memristor of the synapse, reference numeral 820 illustrates a current-voltage characteristic of a selection element of the synapse, and reference numeral 830 illustrates a current-voltage characteristic of a memristor-selection element that is formed by connecting a memristor with a selection element in series and included in a synapse with a cross-bar array structure.

In addition, reference numeral 840 illustrates weight increase (potentiation) and weight decrease (depression) characteristics of the synapse, and reference numeral 850 illustrates Spike Timing Dependent Plasticity (STDP) characteristics of the synapse.

In other words, reference numerals 810 to 830 illustrate current-voltage characteristics of the synapse included the neuromorphic system according to the embodiment described with reference to FIGS. 6 to 8.

Meanwhile, the potentiation characteristic was measured by continuously applying positive pulses, and the depression characteristic was measured by continuously applying negative pulses.

In addition, the STDP characteristic is a characteristic wherein potentiation or depression is determined according to a time difference between signals inputted to both ends of a synapse. When a signal was first applied to the upper electrode of the synapse and then a signal was input to the lower electrode, Long Term Potentiation (LTP) occurred, and when a signal was first input to the lower electrode, Long Term Depression (LTD) occurred. As a time difference between signals was reduced, a change degree increased.

In particular, as shown in reference numerals 810 to 830, the memristor, selection element and memristor-selection element according to an embodiment of the present invention exhibited excellent current-voltage characteristic and linearity.

In addition, as shown in reference numeral 840 to 850, the synapse according to an embodiment of the present invention exhibited excellent potentiation characteristic, depression characteristic and STDP characteristic.

FIGS. 9A to 9G illustrate electrical characteristics of a completely depleted SOI device included in a neuron according to an embodiment of the present invention.

The completely depleted SOI device may be the completely depleted SOI NMOS transistor described with reference to FIG. 3.

Referring to FIGS. 9A to 9G, reference numeral 910 illustrates the characteristics of the completely depleted SOI device operating as a neuron, reference numeral 920 illustrates drain current characteristics according to electrical signals (spikes) inputted into a drain region of the completely depleted SOI device, and reference numeral 930 illustrates drain current characteristics according to amplitude changes in an electrical signal.

In addition, reference numeral 940 illustrates drain current characteristics according to pulse width changes of electrical signals, and reference numeral 950 illustrates drain current characteristics according to pulse intervals of electrical signals.

In addition, reference numeral 960 illustrates persistence characteristics of the completely depleted SOI device, and reference numeral 970 illustrates drain current characteristics according to randomly applied electrical signals.

In particular, change in a drain current was measured after applying a single pulse to the drain region of the completely depleted SOI device, and, as a result, it was confirmed that a current was gradually decreased after input of the voltage pulse, as shown in reference numeral 910. Here, it was confirmed that an RC time constant was about 0.099 s that satisfied several tens of ms as a value required for a neuron to operate.

As shown in reference numeral 920, a drain current was measured after applying an electrical signal to the drain region of the completely depleted SOI device at regular intervals and, as a result, it was confirmed that the current increased each time a voltage pulse was applied and gradually decreased when the pulse was not inputted.

In other words, in the completely depleted SOI device, it was confirmed that the current increased each time a voltage pulse was applied, thereby exhibiting integration characteristics, and, when the pulse was not inputted, the current gradually decreased, thereby exhibiting leakage characteristics.

As shown in reference numerals 930 to 950, it was confirmed that, as the amplitude of electrical signals applied to the drain region of the completely depleted SOI device increased, the pulse width thereof was wide, and an input interval between the electrical signals was narrow, a threshold value of a drain current amount for determining fire increased.

As shown in reference numeral 960, it was confirmed that the completely depleted SOI device could be reset and initialized due to integration and leakage according to inputted electrical signals when the amount of drain current reached a threshold value, and integration, leakage and a reset operation were repeatedly performed without electrical loss.

In other words, it was confirmed that the completely depleted SOI device could continuously operate as a neuron.

As shown in reference numeral 970, it was confirmed that the completely depleted SOI device could perform integration and leakage by randomly applied electrical signals, and when the amount of drain current reached a threshold value according to the performed integration and leakage, the completely depleted SOI device was reset and initialized.

FIG. 10 illustrates a schematic diagram of a single-layer spiking neural network (SNN).

Referring to FIG. 10, a neuromorphic system according to an embodiment of the present invention was simulated as a single-layer SNN composed of 784 input neurons and 300 output neurons.

For a recognition rate test using the simulated neuromorphic system according to an embodiment of the present invention, an MNIST image set was used, and the Spike Timing Dependent Plasticity (STDP) learning rule was applied for learning. Here, the characteristics of the synapse was assumed to be ideal.

FIGS. 11A to 11B illustrate the weights of synapses.

Referring to FIGS. 11A to 11B, reference numeral 1110 illustrates the weights of synapses before learning, and reference numeral 1120 illustrates the weights of synapses after termination of learning.

In particular, referring to reference numerals 1110 to 1120, it was confirmed that the synapse weights after learning of the simulated neuromorphic system according to an embodiment of the present invention were accurate, as shown in reference numeral 1120.

FIG. 12 illustrates the accuracy of image recognition depending upon the number of learning.

In FIG. 12, the simulated neuromorphic system according to an embodiment of the present invention of FIG. 10 was used.

Referring to FIG. 12, it can be confirmed that a recognition rate according to learning progress of the simulated neuromorphic system according to an embodiment of the present invention gradually increases, indicating a maximum recognition rate of 79%.

Meanwhile, embodiments of the present invention disclosed in the present specification and drawings are only provided to help understanding of the present invention and the scope of the present invention is not limited to the embodiments. It will be apparent to those skilled in the art that various modifications can be made to the above-described exemplary embodiments of the present invention without departing from the spirit or scope of the invention.

The invention claimed is:

1. A neuron, comprising a completely depleted Silicon-On-Insulator (SOI) device, wherein a depletion region of the SOI device is controlled according to an inputted electrical signal to perform integration and leakage,
wherein the completely depleted Silicon-On-Insulator (SOI) device is formed by an NMOS transistor device and is configured to perform the integration by accumulating holes in the depletion region corresponding to a source region of the NMOS transistor device when an electrical signal is inputted to a drain region of the NMOS transistor device,
wherein the completely depleted SOI device comprises a substrate with a Silicon On Insulator (SOI) structure that sequentially comprises a first semiconductor layer, a buried insulating layer, and a second semiconductor layer used as a channel layer,
wherein completely depleted SOI device forms the depletion region by accumulating the holes at an end of the source region based on the buried insulating layer,
wherein the holes do not escape through the first semiconductor layer due to the buried insulating layer, and
wherein the second semiconductor layer is formed to a thickness of 3 nm to 100 nm to be completely depleted and comprises an embrittlement region into which hydrogen ions have been implanted through the buried insulating layer.

2. The neuron according to claim 1, wherein the electrical signal inputted through at least one synapse is accumulated in a form of a potential to perform the integration.

3. The neuron according to claim 1, wherein the leakage is performed within an interval time section that is a section from a time at which the electrical signal is input to a time at which a next electrical signal is input.

4. The neuron according to claim 1, wherein the completely depleted SOI device comprises:
a gate insulating film formed on the second semiconductor layer;
a gate electrode formed on the gate insulating film; and
the source region and the drain region disposed on opposite side of the gate electrode and formed to be spaced apart from each other in the second semiconductor layer.

5. The neuron according to claim 4, wherein the second semiconductor layer comprises at least one of silicon, strained silicon and relaxed silicon-germanium (SiGe).

6. A neuromorphic system, comprising:
at least one pre-neuron;
at least one synapse electrically connected to the at least one pre-neuron; and
at least one post-neuron electrically connected to the synapse and configured to comprise a completely depleted Silicon-On-Insulator (SOI) device,
wherein the at least one post-neuron performs integration and leakage,
wherein the completely depleted Silicon-On-Insulator (SOI) device is formed by an NMOS transistor device and is configured to perform the integration by accumulating holes in a depletion region corresponding to a source region of the NMOS transistor device when an electrical signal is inputted to a drain region of the NMOS transistor device,
wherein the completely depleted SOI device comprises a substrate with a Silicon On Insulator (SOI) structure that sequentially comprises a first semiconductor layer, a buried insulating layer, and a second semiconductor layer used as a channel layer,
wherein completely depleted SOI device forms the depletion region by accumulating the holes at an end of the source region based on the buried insulating layer,
wherein the holes do not escape through the first semiconductor layer due to the buried insulating layer, and
wherein the second semiconductor layer is formed to a thickness of 3 nm to 100 nm to be completely depleted and comprises an embrittlement region into which hydrogen ions have been implanted through the buried insulating layer.

7. The neuromorphic system according to claim 6, wherein a depletion region of the at least one post-neuron is controlled according to an inputted electrical signal (spike) to perform the integration and the leakage.

8. The neuromorphic system according to claim 6, wherein the synapse has a cross-bar array structure.

9. The neuromorphic system according to claim 6, wherein the synapse comprises a memristor and a selection element.

10. The neuromorphic system according to claim 6, wherein the neuromorphic system further comprises an adder.

* * * * *